W. W. CASSELL.
CENTER MOLD FOR ICE CREAM.
APPLICATION FILED MAY 5, 1909.
1,094,878.
Patented Apr. 28, 1914.
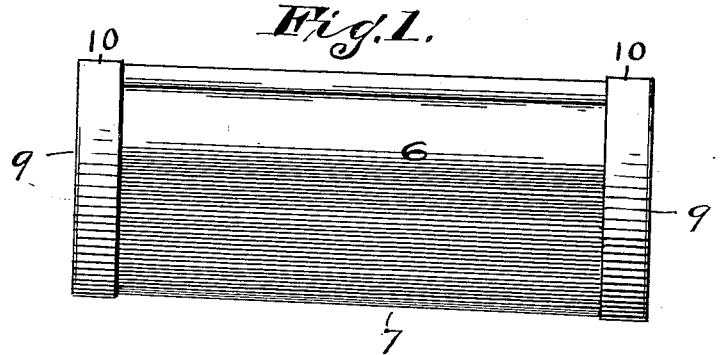
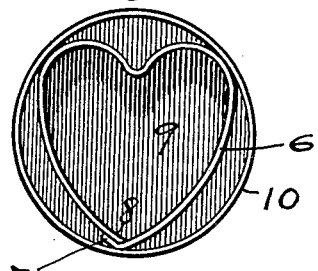
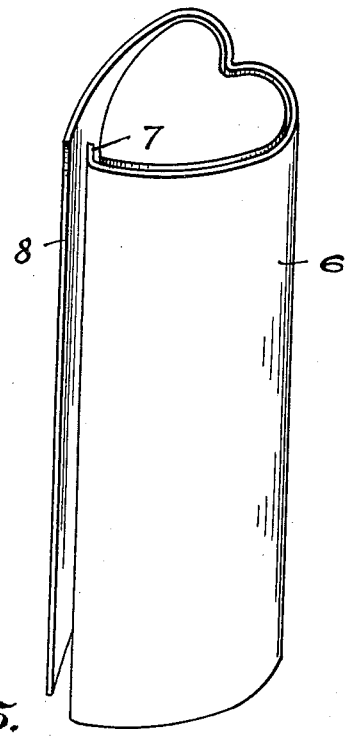
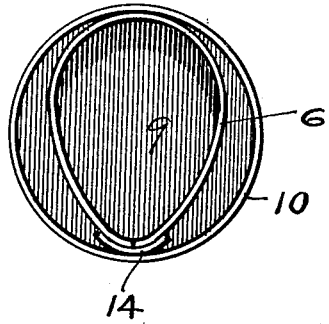
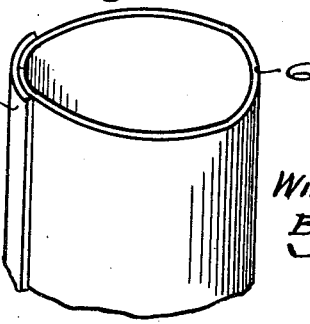
WITNESSES:
L. B. Woerner
Wm Hurte
INVENTOR:
WILLIAM WALKER CASSELL,
By Minturn & Woerner,
Attorneys,
COLUMBIA PLANOGRAPH CO., WASHINGTON, D. C.

UNITED STATES PATENT OFFICE.

WILLIAM WALKER CASSELL, OF VINCENNES, INDIANA.

CENTER-MOLD FOR ICE-CREAM.

1,094,878.  Specification of Letters Patent.  Patented Apr. 28, 1914.

Application filed May 5, 1909. Serial No. 494,044.

*To all whom it may concern:*

Be it known that I, WILLIAM WALKER CASSELL, a citizen of the United States, residing at Vincennes, in the county of Knox and State of Indiana, have invented certain new and useful Improvements in Center-Molds for Ice-Cream, of which the following is a specification.

This invention relates to improvements in molds and has particular reference to such as are used for imparting fancy shapes or figures to ice-cream, and the invention will probably be most used for molding an ornamental center of one kind or color of ice-cream for a brick or block of another kind or color.

The object of my invention is to provide a simple, efficient and inexpensive mold for the above purpose made in detachable parts, the principal part of which for shaping the sides of the product will be in one piece split longitudinally and made of resilient material, whereby, when liberated in taking the mold apart to remove the product said resilient portion will spring apart and free itself so as to permit the product to be readily removed without injury to same.

With the above and other objects in view the invention consists of certain novel features of construction, combination and arrangement of parts, as will be hereinafter fully described and pointed out in the appended claim.

In the accompanying drawings Figure 1 is a side elevation of a mold embodying my invention, the same being adapted for molding ice-cream in the form of a heart or a center of such shape for a brick or block. Fig. 2 is an end view of same with the near cap or lid removed. Fig. 3 is a perspective view of the side walls of the mold in its released position after the removal of the end caps, the view showing the product and the manner in which it is released by the resiliency of the sides of the mold. Fig. 4 is a view like Fig. 2 of a mold to produce a figure in the form of an egg in cross section, this view showing a modified construction for uniting the edges formed by the split in the mold, and Fig. 5 is a perspective view of one end of the side walls such as are shown in the modification in Fig. 4.

Like characters of reference indicate like parts throughout the several views of the drawing.

The sides 6 of my mold are made out of any suitable material, such as heavy tin of good quality, having sufficient resiliency and being so shaped and strained when in use as to spring apart at its longitudinal edges when not positively retained. The mold shown in Figs. 1, 2 and 3, is adapted to form a core or center for ice-cream in the shape of a heart in cross section and is made of one piece of sheet-metal with two longitudinal separable edges, one of which is bent to form a longitudinal flange or integral strip 7 under which the opposite longitudinal edge 8 of the mold is locked, in a manner clearly shown in Fig. 2, while the mold is in use. This locked condition is retained by sheet-metal caps 9 having flanges 10 forming a recess or socket into which the ends of the mold 6 are inserted. The caps are here shown as round in outline, which shape is preferable on account of the greater ease with which the caps may be manufactured, and also because the same cap may be used interchangeably with other forms of molds, that is molds in which to make ice-cream centers other than heart shape in cross section, as for example like that shown in Fig. 4.

In Figs. 4 and 5 the two longitudinal edges of the split mold 6 come together without lapping, and instead of being held or locked by an integral strip 7 they are held by a separate outside strip 14 which extends longitudinally of the mold and overlaps both edges of the mold, and these parts, thus assembled, are locked by caps 9 having flanges 10, as has been previously described.

The construction, use, and advantages of my invention will be readily understood from the foregoing description, taken in connection with the accompanying drawings. It will be seen that by means of a mold constructed in this manner of one piece split longitudinally the molded object may be readily removed by simply removing the end caps from the ends of the side sections of the mold whereupon the resiliency of said sides will cause them to spread and draw away from each other and from the frozen center.

Having thus fully described my invention what I claim as new and wish to secure by Letters Patent of the United States, is—

A mold of the class described comprising a body portion formed of resilient metal and having disconnected ends whereby the resiliency of the metal will spring or expand the sides, caps arranged on the opposite ends of the mold and having flanges to engage and hold the sides thereof in retracted or operative position, and a V-shaped binding strip for holding the disconnected ends of the body portion of the mold together, the ends of said strip extending between the flanges of the caps and the body portion.

In witness whereof, I have hereunto set my hand and seal at Vincennes, Indiana, this 24th day of April, A. D. one thousand nine hundred and nine.

WILLIAM WALKER CASSELL. [L. s.]

Witnesses:
MARTIN L. CASSELL,
HENRY OSTENDORF.

Copies of this patent may be obtained for five cents each, by addressing the "Commissioner of Patents, Washington, D. C."